June 18, 1935.  H. ZIMMER  2,005,406
SUCTION FILTER
Filed Feb. 16, 1934
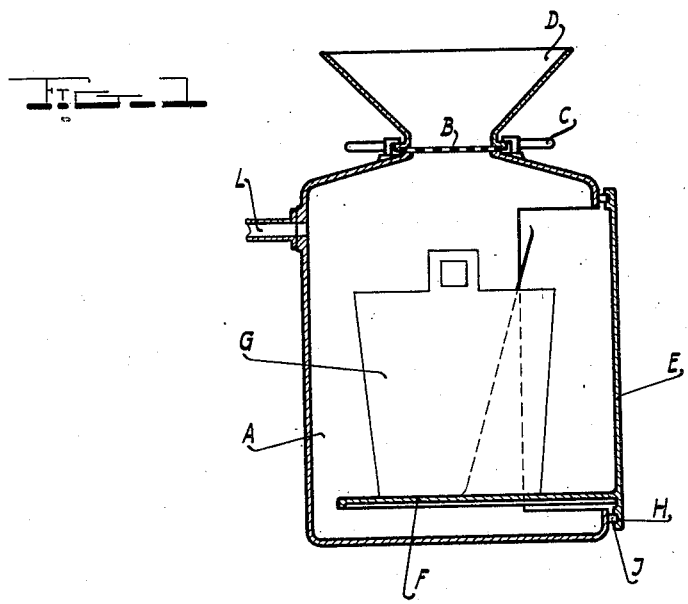
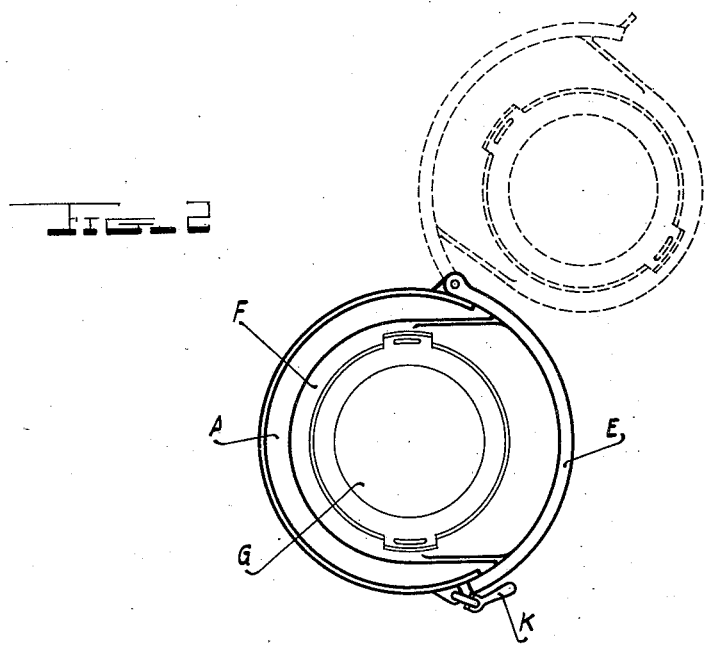
Inventor
Henry Zimmer,
by R. J. Whitaker,
his Attorney Patented June 18, 1935

2,005,406

UNITED STATES PATENT OFFICE 2,005,406

SUCTION FILTER

Heinrich Zimmer, Varnsdorf, Czechoslovakia

Application February 16, 1934, Serial No. 711,592
In Germany December 2, 1932

1 Claim. (Cl. 210—149)

This invention relates to filters and specifically to a filter especially adapted for filtering inks of the type used for printing fabrics.

Purification of printing inks or dyes by filtering through a filter in which a vacuum is created is recognized by those skilled in the art as the best method, but difficulties have been hitherto experienced in manipulating filters of this type.

In filters of known construction it has been customary to use an iron collecting tank into which fits an empty vessel of about 26 gallons capacity, the vessel being closed at its top by an iron cover fitted into position, packed externally, and firmly bolted down into place. The cover is provided with a filtering sieve and a charging funnel into which the liquid to be filtered is poured, the source of vacuum being then connected up and the filtering operation carried out. At the termination of the filtering operation it has been necessary to remove the cover securing bolts, lift the heavy cover from the vessel and raise the filled filtrate collecting vessel from the tank. This operation has been found inconvenient and tedious and also necessitated at least two strong operative forces. For these reasons devices constructed and set forth above have not been extensively used.

Suction filters formed of earthenware and provided with a removable funnel for receiving the material to be filtered and carrying a filter sieve are not suitable for filtering printing inks as the filtrate is collected directly in the outer tank and must then flow out through an outlet located in the bottom. This process is not suitable for printing inks as at each change of color the tank must be thoroughly cleaned. This cleaning process is entirely eliminated in a filter constructed in accordance with my invention as the filtered, pasty masses are collected in a separate collecting vessel of wood or metal, fitted into the outer tank, in which they can be transferred directly to the printing machines.

My improved filter is illustrated in the accompanying drawing wherein:—

Figure 1 is a view showing the improved filter in vertical section, and

Fig. 2 is a sectional view taken horizontally through the filter and indicates by dotted lines the manner in which the filtrate collecting receptacle is swung out of the tank.

The outer tank A of this improved filter is provided with an opening at its top through which filtrate is to flow from a funnel D which rests upon the top of the tank about the opening as shown in Fig. 1. A sieve or screen B is provided at the lower end of the funnel with its marginal portions located between the top of the tank and a flange carried by the funnel. The funnel together with the sieve are securely but detachably held in place by fasteners C pivoted to the top of the tank in spaced relation to each other and having handles which project outwardly so that they may be grasped and the fasteners turned into and out of position to overlie the flange of the funnel.

The tank is formed with a side opening which is to be closed by a door E which is curved transversely to conform to the outline of the tank and adjacent its lower end the door carries a platform or shelf F which projects inwardly from the door into the tank when the door is closed and serves as a support for the filtrate vessel G. This vessel is in the form of a bucket having handles at its upper end so that it can be easily lifted and set into place upon the platform or removed therefrom. By simply closing the door the filtrate collecting vessel will be swung into position under the sieve and filtrate passing through the sieve will pass downwardly into the vessel. About its margins the door has its inner face formed with a groove H into which a rubber packing J is fitted and as the door is of greater dimensions than the side opening of the tank this packing will bear against the tank when the door is closed and form an air tight joint. Fasteners K of a conventional construction are provided to secure the door closed and apply pressure to the gasket.

As soon as the door is closed suction is exerted through the pipe L thereby creating a partial vacuum in the tank and ink poured into the funnel will be drawn through the sieve. This ink flows from the sieve and is caught in the receptacle G which is of sufficient dimensions to eliminate any danger of the filtered ink dripping upon the platform F instead of into the receptacle. At the termination of the filtering operation air is admitted into the tank to create atmospheric pressure therein and the door is then released and swung outwardly to an open position. As the door swings open the platform moves with it and the receptacle will be disposed externally of the tank as indicated by dotted lines in Fig. 2 where it can be grasped by its handles and lifted from the platform. Another receptacle can then be set in place and the door closed so that the filtering operation can be repeated. If ink of another color is to be filtered the funnel and sieve will be removed and either thoroughly cleaned and replaced or another sieve and funnel used for ink of the color to be filtered substituted for the ones removed.

I claim:

A filter comprising a tank having a top and a bottom and side walls, the top being tapered upwardly and having an opening formed therein, a sieve covering the opening in the top and having marginal portions resting upon the top about the opening, a funnel disposed over the top and having its lower end resting upon the marginal portions of the sieve, an outstanding flange being provided about the lower end of the funnel, fasteners pivotally carried by the top in spaced relation to each other circumferentially of the opening and having outstanding handles whereby the fasteners may be turned into and out of position for engaging the flange and clamping the funnel and sieve in place, a suction pipe leading from said tank near the upper end thereof, an opening being formed in the side walls of the tank, a door hinged at one side to the outer face of the side walls of the tank for movement into and out of position to close the opening in the side walls, a platform projecting from the inner face of said door adjacent the lower end thereof and disposed within the tank when the door is closed, vertical webs extending between side portions of the door and platform to brace the platform against downward strain, a removable receptacle resting upon said platform and disposed under the sieve when the door is closed, grooves formed in the inner face of the door adjacent margins thereof, packing mounted in the grooves and projecting from the inner face of the door for engaging the outer face of walls of the tank about the side opening when the door is closed, and means to releasably secure the door closed and apply pressure to the packing to form a tight joint about margins of the door.

HEINRICH ZIMMER.